United States Patent [19]

Kantner

[11] Patent Number: 4,511,963
[45] Date of Patent: Apr. 16, 1985

[54] EMULATION OF SPECIAL PURPOSE MAGNETIC TAPE DATA RECORDING EQUIPMENT BY A GENERAL PURPOSE PROCESSOR

[75] Inventor: Robert F. Kantner, Delray Beach, Fla.

[73] Assignee: International Business Machines Corp., Armonk, N.Y.

[21] Appl. No.: 412,669

[22] Filed: Aug. 30, 1982

[51] Int. Cl.³ .............................................. G06F 3/04
[52] U.S. Cl. ................................................. 364/200
[58] Field of Search ........................ 364/200, 900, 300

[56] References Cited

U.S. PATENT DOCUMENTS 4,207,687 6/1980 Haas et al. .......................... 364/200
4,280,193 7/1981 Baun et al. .......................... 364/900

Primary Examiner—Gareth D. Shaw
Assistant Examiner—Jameson Lee
Attorney, Agent, or Firm—Robert Lieber

[57] ABSTRACT

Substitution of a general purpose data processing system for special purpose magnetic tape recording equipment, in certain existing network environments—one example being present telephone call billing networks—offers advantages in respect to equipment costs and data handling efficiency, but requires presently disclosed adaptation for effecting the substitution efficiently and with complete transparency to unaltered parts of the environmental (host) network. While simulating a data recording operation the substituted system receives an arbitrary length train of data bytes clocked at a first rate followed by a cyclic redundancy check (CRC) byte timed at a slower second rate. In order to maintain network transparency, the substituted system must retransmit the data and CRC check bytes, in their received order and at their respective reception rates, after a delay associated with the physical separation between recording and reproducing heads in the "native" tape recording equipment. The system also must generate and transmit an LRC (longitudinal redundancy check) character following the CRC byte. Such "echo" (verification) transmissions are effected by disclosed means which determine the instant of real time at which the substituted system has completed its retransmission of the last data byte and switch an internal echo transmission timing reference from a source associated with data byte retransmissions to one associated with CRC and LRC transmissions. Other disclosed means operates to generate an LRC character—which in the native tape equipment is formed directly by the action of resetting magnetization levels in bit track recording heads operating in NRZI mode—and to cause delayed transmission of that character immediately following the echoed CRC character.

10 Claims, 7 Drawing Figures

EMULATION OF SPECIAL PURPOSE MAGNETIC TAPE DATA RECORDING EQUIPMENT BY A GENERAL PURPOSE PROCESSOR

FIELD OF THE INVENTION

This invention relates to computer system applications and particularly to applications involving replacement of presently obsolescent magnetic tape storage devices in existing networks.

BACKGROUND OF THE INVENTION

In certain existing data processing networks magnetic tape storage equipment is being used in an inefficient and probably obsolescent manner. After recording information on tape reels at one station, the reels are removed for shelf storage and subsequently manually carried to and mounted at another station where another data processing system processes the recorded data. Many telephone message accounting and call billing networks operate in this manner.

This is quite inefficient by comparison to systems which employ more modern equipment to achieve similar functions, e.g. large capacity disk storage equipment for the data storage function, and telecommunication equipment for functions comparable to the manual transportation of tapes between recording stations, shelf storage facilities and processing stations.

However, direct adaptation of such networks to interface with more modern storage and communication equipment, e.g. by redesign of interfacing equipment and software at the recording and processing stations, is considered too costly and impractical. A more practical expedient, which forms the environmental basis of the present invention, is to link existing recording and processing station equipment "plug-compatibly" to upgraded storage and communication media through an electronically simulated adaptation interface and a "linking" minicomputer (or possibly microcomputer) system. Desirably, the simulating adaptation equipment should make the substitution appear to be plug compatible to the equipment and software reliant on magnetic tape storage; i.e. it should directly emulate the real time signalling processes of magnetic tape storage equipment relative to the recording and processing stations of the network, and otherwise operate in complete "transparency" to the existing (unaltered) parts of the network.

A problem encountered in respect to "electronically" emulating signalling processes of magnetic tape storage equipment is that information transferred at interfaces to such equipment usually consists of variable length trains of data bytes iterated (in byte serial bit parallel form) at a first byte clocking rate, and each train is terminated by a cyclic redundancy check (CRC) character having a slower second clocking rate. For verification purposes, the emulating adapter equipment must "echo" the received data and CRC bytes back to the source equipment, in the order of their reception and with the same byte clocking rates; and this must occur after a predetermined delay (which in the real tape storage equipment is associated with the physical movement of the tape between recording and reproducing heads).

Consequently, an emulating adapter operating electronically should be able to buffer at least portions of the received information train, retransmit buffered data after a predetermined delay, determine precisely when the last byte of data is being retransmitted, switch its internal transmission clocking reference from a first source associated with data byte retransmission to a second source associated with CRC retransmission and then retransmit the CRC byte. Since the number of data bytes is variable, determination of the time of last data byte retransmittal is not a simple logical task (even if reception of that byte is explicitly marked by a control signal from the source equipment).

Furthermore, in the replaced magnetic tape storage equipment information usually is recorded in the NRZI mode and the action of resetting magnetization levels at the bit recording heads after the recording of the CRC character, produces a state of magnetization on the tape which represents a longitudinal redundancy check (LRC) character. This character normally is picked up at the reproducing head after retransmission of the CRC character and transmitted to the origin station equipment contiguous in time to the CRC character and at the same "second" clocking rate as the CRC character. An additional problem in respect to the present simulation is to generate, buffer and transfer an equivalent LRC character by logical electronic means.

Objects of the present invention are to provide "plug compatible" adaptation means for electronically simulating communication operations of magnetic tape storage equipment at an interface between unaltered data recording and processing stations of an existing data processing network and a mini or micro-computing system serving relative to such stations as a replacement for magnetic tape storage equipment. Ancillary objects are to provide simple and cost effective electronic means for solving the foregoing problems in respect to verification retransmittals of varied length trains of data and CRC bytes, and in respect to generation and transmittal of LRC characters.

SUMMARY OF THE INVENTION

In accordance with the foregoing objects means are presently provided for plug-compatibly (i.e. "transparently") simulating operations of magnetic tape storage equipment relative to predetermined record transfer interfaces of preexisting and otherwise unaltered data processing networks and for linking such interfaces with various auxiliary storage, processing and telecommunication resources capable of improving network performance and functions at a cost which compares favorably to the cost of continuing magnetic tape usage and handling.

Furthermore, in accordance with the present invention, such simulating means comprises means for receiving and delayably retransmitting variable length information signal trains, each train containing a variable number of data byte signals clocked at a first predetermined rate and concluding with a CRC character clocked at a second predetermined rate slower than the first rate; the reception and delayable retransmission of said trains being conducted relative to equipment originating said received trains and verifying correct reception; means for timing said delayed retransmissions variably so that said data bytes and CRC characters may be retransmitted respectively at said first and second rates; means for conditioning said timing means to time data byte retransmittals at said first rate; means for determining the instant of time at which the retransmittal of the last data byte in a received train has been completed; and means responsive to said determination for conditioning said timing means to time the immediately following retransmittal of the CRC character at said second rate.

Furthermore, in accordance with the present invention such simulating means comprises means for generating an LRC character for each received train having a predetermined logical relationship to all of the data and CRC information in the train, and means for transmitting the LRC character, immediately after retransmittal of the associated CRC character, at said second rate.

The foregoing and other objects and features of the invention will be more fully understood from the following detailed description and claims.

DETAILED DESCRIPTION

Introduction

Figure 1:
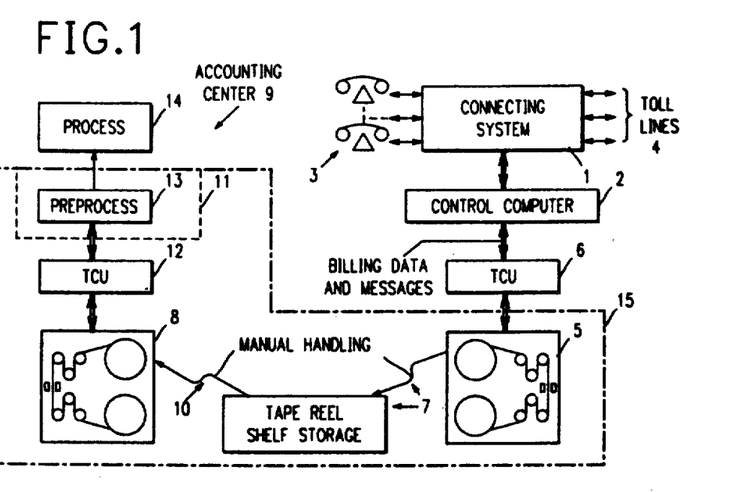
FIG. 1 is a schematic block diagram of a representative data processing network employing magnetic tape storage facilities replaceable by means of an emulating adapter and auxiliary mini-computer system configured in accordance with the present invention.

In a representative telephone call processing system environment, FIG. 1 illustrates the type of data handling procedural problems which are addressed and remedied by the present invention. Connecting system 1, in a telephone switching office, operates under direction of control computer system 2 to interconnect local subscriber telephone sets 3, and to extend connections between sets 3 and remote subscribers via toll/trunk lines 4. System 2 interacts with (NRZI) magnetic tape storage equipment 5, via tape control unit (TCU) equipment 6, to record call information for billing purposes and control messages.

Information to be recorded is presented by system 2 in record trains which are retransmitted (echoed back) by the equipment 5,6 after a predetermined delay for verification purposes (the delay is a function of the tape speed and the separation between recording and read-while-recording heads in the equipment 5). System 2 may direct equipment 5,6 to back up tape and read previously recorded records for other processing purposes; e.g. diagnostics and recovery after error.

Record trains originated by system 2 and echoed by equipment 5,6 are transferred in a predetermined bit parallel byte serial form (each byte consisting of 8 information bits and a single parity check bit), with predetermined byte signal timings and variable byte lengths (numbers of bytes per record). Each train sent by system 2 consists of a variable number of data byte signals recurrent at a first predetermined timing rate followed by a single CRC (cyclic redundancy check character) byte signal appearing (immediately after the last data byte) at a predetermined second rate slower than the first rate. Each echoed train, if properly received and returned, consists of the same data and CRC bytes presented at the same respective first and second rates followed by an LRC (longitudinal redundancy check) byte presented (immediately following the CRC byte) at the same rate as the CRC byte.

As tape reels are filled they are manually removed from the equipment 5 and usually stored on shelves, or the like, as suggested at 7. Subsequently, reels are taken from such shelves, manually carried to and mounted on playback equipment 8 at an "accounting" processing center 9, which may be physically remote from the system 2, for carrying out customer billing processes. The manual handling at this stage of the procedure is suggested at 10. The accounting processing system, suggested in dotted outline at 11, interacts with the storage/playback equipment 8 through a respective TCU control unit 12 to retrieve and process information.

The accounting process may be viewed as having preprocessing and advanced processing stages suggested respectively at 13 and 14. In the pre-processing stage information records are individually verified using the parity check, CRC and LRC information therein and translated into a form common to all information collectively processed at that center. This center may receive information from a variety of storage equipments and need not be restricted in its handling to the particular format used by system 2 relative to tape equipment 5,6. In the advanced processing phase 14 the commonly formatted information is processed to prepare appropriate customer bills and maintain suitable records. The preprocessing stage may, if desired, extend into some of the advanced processing activities; for instance the collection and sorting of call billing information relative to individual subscribers.

A principal objective of the present invention is to replace the manual handling suggested at 7 and 10 with an overall decrease in information handling costs. This is accomplished presently by partitioning off the storage and pre-processing functions as suggested in dotted outline at 15, and replacing the tape equipment and preprocessing functions within this partition with auxiliary computing and adapting equipment requiring no manual handling. Additional increments of cost efficiency and value are obtained by making the operations and adaptation of the substituted auxiliary system entirely transparent to the hardware and software of the connecting control system 2, and extending functional responsibilities of the substituted system to include the pre-processing handling 13 (thereby easing the processing load on the accounting center, and occupying otherwise idle time of the substituted auxiliary computer).

The Substitute System

Figure 2:
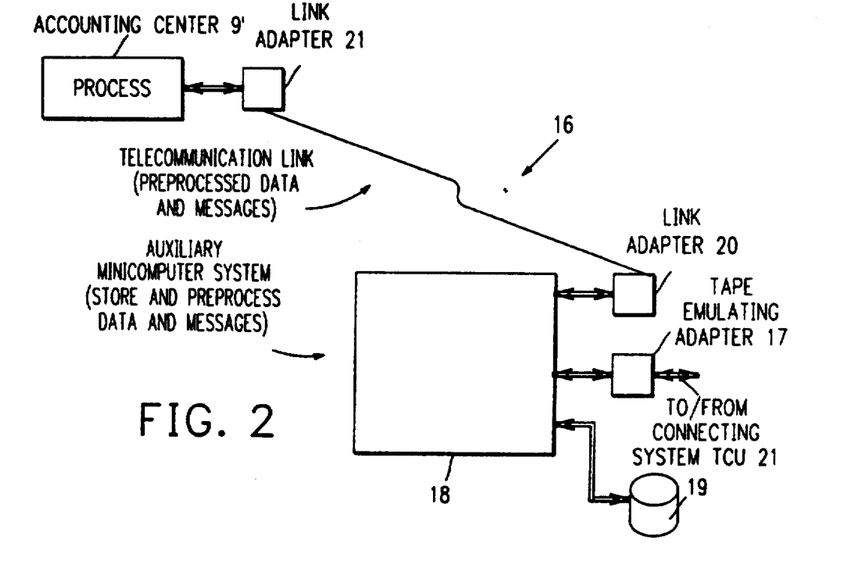
FIG. 2 is a schematic block diagram of the same network with the adapter and auxiliary computer substituted for tape equipment and pre-processing elements of FIG. 1.

Referring to FIG. 2, the auxiliary system 16, which is substituted presently in the partitioned portion 15 of the environmental network of FIG. 1, includes a tape emulating adapter 17, an auxiliary computer 18, direct access storage equipment 19 attached peripherally to computer 18 and peripheral adapters 20 and 21 for communicatively linking computer 18 with the accounting center 9. The center is shown in FIG. 2 as 9' to suggest that it has been modified by off-loading of its pre-processing responsibilities (tape record verification, tape format translations, etc.) and adaptation of its software for the communication process.

The tape emulating adapter 17, of particular interest presently, connects with the TCU equipment 6 (FIG. 1) via a bussing interface shown generally at 21, and operates relative to that TCU, controlling system 2 and the latter's supervisory and scheduling software to permit the auxiliary computer 18 and its storage equipment 19 to function as an entirely transparent (i.e. plug-compatible) substitute for the magnetic tape equipment 5. For this purpose adapter 17 must echo received records with the form and timing expected by the TCU 6, and provide specific linking translations between auxiliary computer 18 and TCU 6.

For the indicated configuration, a minicomputer system such as the IBM Series/1 has sufficient real time operating speed and storage capacity (internal and peripheral) for performing all of the functions required by the auxiliary computer 18. Those skilled in the art will, of course, recognize that, with current trends in technology, a microprocessor system might lend itself to such usage at potentially lesser cost.

The Emulating Adapter

Figure 3:
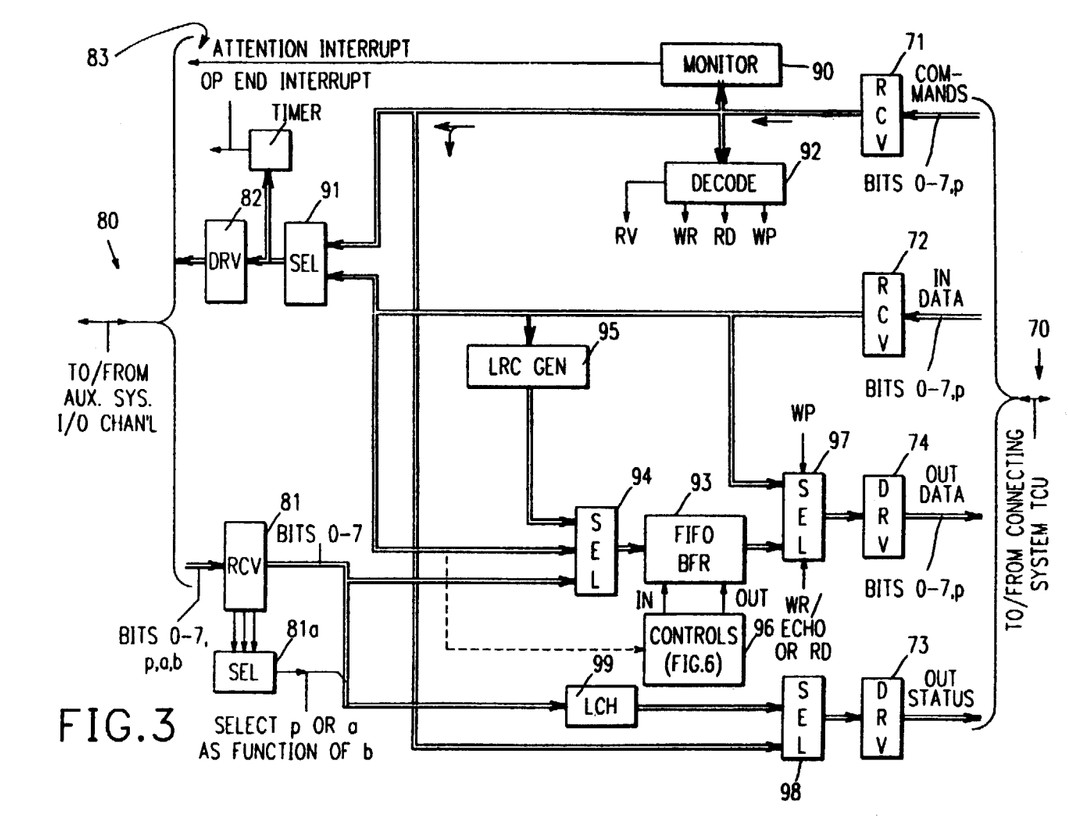
FIG. 3 is a block diagram of the logical organization of the adapter unit shown in block form in FIG. 2, illustrating general details of its logical organization.
Figure 5:
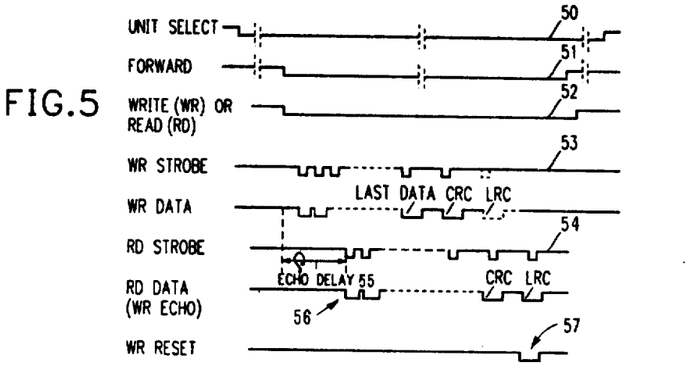
Figure 6:
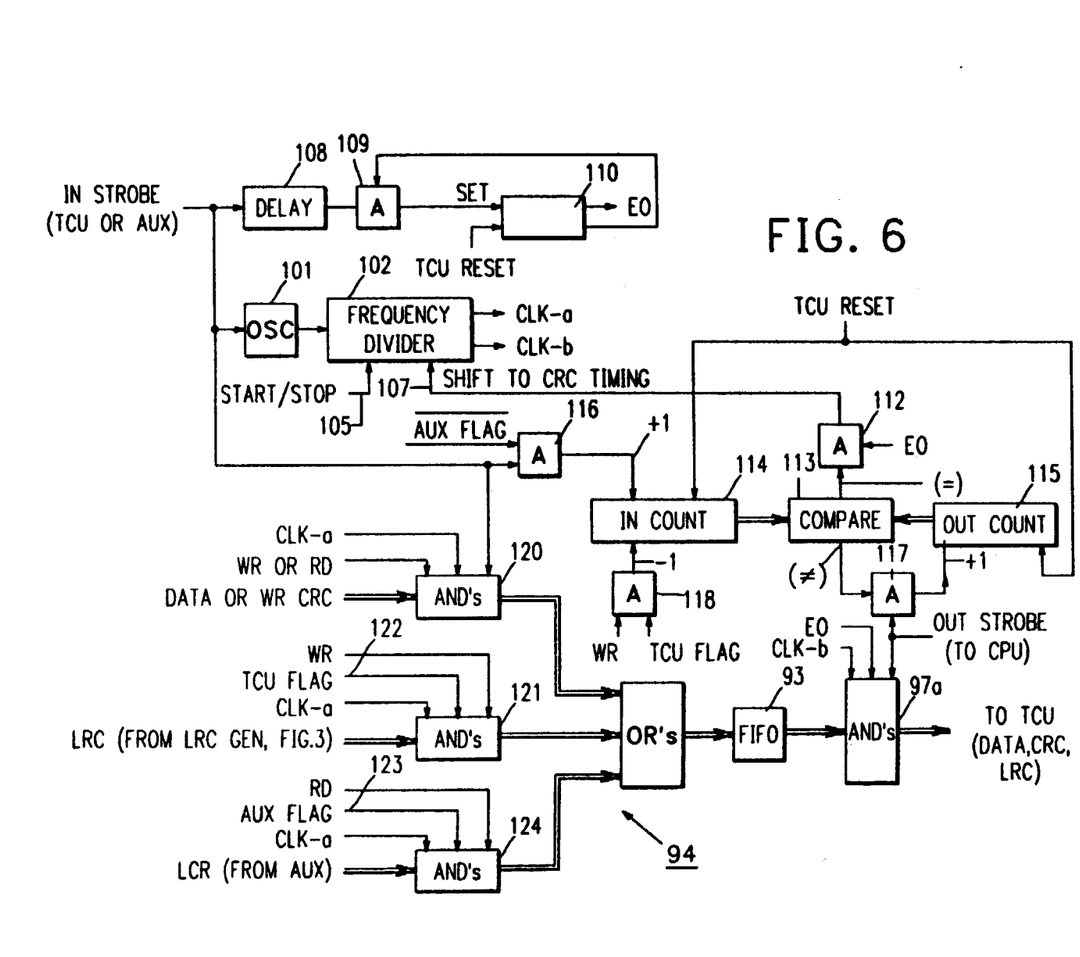
FIG. 6 illustrates specific details of the adapter logic.
Figure 7:
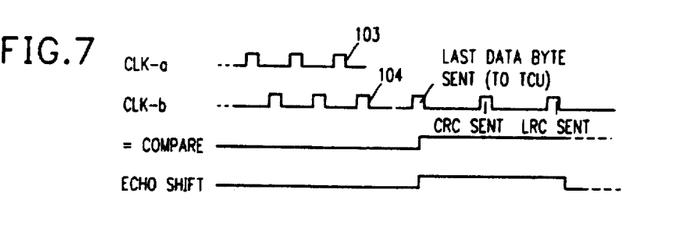
FIG. 7 illustrates timing of certain clocking and control signals produced in the adapter unit.

The adapter 17 (FIG. 2), which embodies the principal elements of novelty and uniqueness of the present invention, is illustrated in block schematic form in FIG. 3 with details of control logic and timing given in FIGS. 6 and 7. Problems required to be solved in constructing this adapter will best be understood by considering the formats of information and control signal transmissions exchanged at interface 21 (FIG. 2), these being illustrated in FIGS. 4 and 5.

Figure 4:
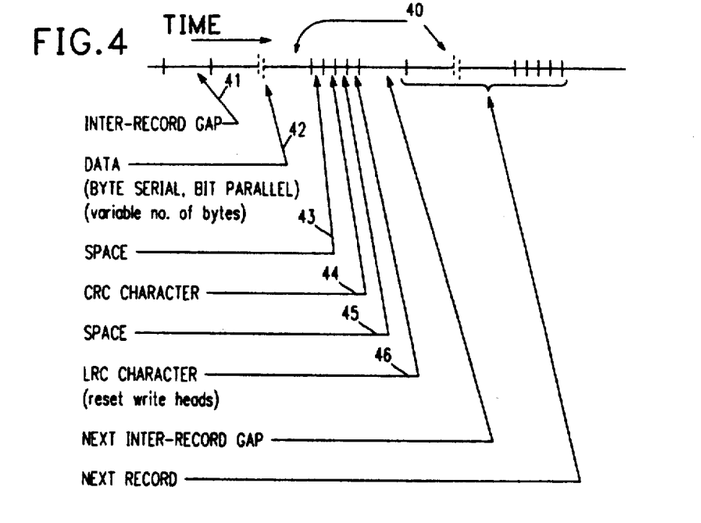
FIGS. 4 and 5 illustrate the form and timing of information and control signals exchanged at recording station interfaces of the environmental network.

As shown in FIG. 4, information records consist of variable length byte signal trains 40 separated by quiescent periods which represent inter-record gaps 41. Control signals presented during such gap periods enable the real tape equipment such as 5 (FIG. 1) to be brought up to suitable operating speed and positioned for recording the following record train. Each record train sent from the TCU to the storage equipment consists of a variable number of uniformly timed data byte signals 42, followed by a time space 43 longer than the space allotted to a data byte, followed by a CRC byte signal 44, followed by another space 45 equal in time to the space 43, followed by a reset interval 46 associated with LRC generation (at the tape heads) and then the next interrecord gap 41. A control signal presented to the recording equipment at the end of space 45 causes the latter to reset its bit writing heads while the tape is still in uniform forward motion. These heads operate in the well-known NRZI mode and the effect of this reset is to produce a condition of magnetization on each bit track of the tape which represents the parity of all bits previously recorded in that track for the same record.

FIG. 5 indicates some of the control signals used by the TCU to direct the recording equipment to write (store) data records and read (play back) previously recorded records. It also illustrates the echoing operation which accompanies and generally overlaps each Write operation. Unit select signal 50 actuates the recording equipment and forward signal 51 controls the equipment to drive the tape in the forward (recording) direction. Thereafter, a Write or Read command 52 causes the equipment respectively to either receive and originally record data bytes (Write) or read out and transmit bytes of a previously recorded record (after a not shown searching operation which will be briefly discussed later). Receptions and transmittals of bytes at the tape equipment are timed by discrete Write and Read "strobe" functions 53 and 54.

In association with each Write operation, the data just recorded on tape passes a "read-while-record" head after an "echo" delay 55 (which depends on tape speed and head spacing), and is read out by that head and transmitted to the TCU as a verification "echo" 56. After recording of the CRC character, the write reset flag from the TCU 57 causes the recording heads to be driven to predetermined initial states of saturation which results in recording of an LRC character on the tape at an appropriate distance behind the just recorded CRC character.

Now consider the problem posed when attempting to simulate the Write echoing operation equipment by purely electronic means. Such means must include a buffer having capacity to store at least the maximum number of bytes which could be received during the delay period 55, the buffer must be accessible to read out the data (for echoing to the TCU) in the sequence of reception and at a timing rate corresponding to the original reception rate, the controls for reading data into the buffer must not block (interfere with) the echoing readouts, the data bytes echoed to the TCU must be timed at the same rate as the original bytes received from the TCU, and most significantly there must be means for recognizing the readout and echoing of the last data byte of each record (recall that the position of this in time is variable), and for switching time base references in response to such recognition, so that the echoed CRC and LRC bytes are sent at the required different spacing 43–46 (FIG. 4).

Recognition of the echoing readout of the last data byte could be accomplished "straightforwardly" by marking the position of that byte in the aforementioned buffer. However, this would require dedication of capacity in that buffer for recording appropriate marking bits (one per byte) to explicitly distinguish the last recorded data byte from all previously recorded data bytes in the same record. Since bytes presently of interest have 9 bits (8 information bits and a parity bit), and many commercially available electronic storage modules suitable for use as buffers are configured to access 9 bits at a time, dedication of buffer space for a marker bit per data byte would require use of a non-standard module configured for 10-bit access. Use of such a non-standard 10-bit access configuration would undesirably increase costs.

The preferred adapter embodiment to be described next avoids this disadvantage. Using simple logic it continually monitors and compares the number of incoming bytes of data received from the TCU and the number of outgoing bytes being echoed to the TCU. With an adjustment described below these monitored numbers remain unequal from the time of receipt of the first data byte through the time of echoing of the last data byte (of each record) and they become equal (or equivalently their difference becomes 0) only as the last data byte is echoed. This change is used as a time base switching reference for controlling the timing of echoed CRC and LRC bytes.

Elements of the subject adapter are illustrated in block schematic form in FIG. 3, and details of the logic for determining when the last data byte of a record is being echoed are given in FIG. 6. At its bussing interface 70 to the TCU the adapter comprises receiving circuits 71 and 72, for respectively receiving command information and data, and driving circuits 73 and 74 for respectively transmitting status information and data. At its interface 80 to the auxiliary computer system (18, FIG. 2) the adapter contains receiver circuits 81, for receiving data and control signals from the auxiliary system, and driver circuits 82 for sending command and data information to that system. The adapter uses lines 83 for presenting interruption requests to the auxiliary system.

Circuits 90 continually monitor outputs of receivers 71 and present an attention interrupt request to the auxiliary system as soon as a new command is detected. At such times the command information is passed to the bussing interface 80 through selection circuits 91 and drivers 82. Upon responding to the interruption the auxiliary system receives and interprets the command and prepares for a real time interaction with the TCU (data transfer to or from the TCU).

Decoding circuits 92 decode commands transferred by receivers 71 for operating internal logic of the adapter. Some of the decoded outputs which will be discussed later are WR (for Write commands), RD (for Read commands), RV (for Reverse commands) and WP (for Wrap commands).

Write commands are used to transfer data records from the TCU to the auxiliary system; via receivers 72, selector 91 and interface 80. These commands also actuate the adapter to pass data into FIFO (first-in-first-out) buffer store 93 via selector circuit 94. Buffer 93, operating in association with LRC generator 95 and timing controls 96, delayably buffers the incoming data, appends an LRC character behind the CRC character of the incoming record and transfers the delayed data, CRC and LRC to the TCU, via selector 97 and drivers 74, in an echo transfer operation. The delay imposed in buffer 93 is considerably shorter than the average length of a record, and the capacity of the buffer is commensurately much less than needed to store a complete record of average length. The logic of controls 96 and the handling of this echoing operation will be discussed in detail later.

Read and Reverse commands transfer signals from the auxiliary system to the TCU; via receivers 81, selector 94, FIFO buffer 93, selector 97 and output drivers 74. Read commands cause the auxiliary system to transfer "previously recorded" data records, while reverse commands cause the auxiliary system to transfer signals simulating the output of real magnetic tape equipment while backspacing tape (running in reverse) for enabling the TCU to locate "previously recorded" records.

Wrap commands, used for diagnostics, cause the adapter to connect the output of receivers 72 directly to drivers 74 via selector 97—i.e. bypassing the FIFO buffer—for enabling the TCU to test the operativeness of its data path connections with the adapter. Other unspecified commands transfer status to the TCU via selector 98 and drivers 73. One such command conditions the auxiliary system to pass its status information (as "simulated magnetic tape storage equipment") to the adapter, via receivers 81, and adapter latches 99. Another command causes the adapter to "wrap" commands from receivers 71 to drivers 73, via selector 98, for diagnostics of the command transfer path between the TCU and adapter.

In response to Write commands data is passed from the TCU directly to the auxiliary system—through receivers 72, selector 91 and drivers 82—and also circulated through FIFO buffer 93 and drivers 74 for the above-mentioned echo transfer operation. In such operations, buffer 93 is used to simulate the real time echoing delay of real tape equipment such as 5 (FIG. 1), which is a function of spacing between record and playback heads and tape speed (in normal forward motion). In one exemplary application in which data to be recorded is transferred at a rate of 20,000 bytes per second, and echoed after a delay of 6 milliseconds, a FIFO buffer capacity of 120 bytes has been found to be adequate.

In such Write operations the data bytes and CRC are transferred from the TCU in a bit parallel byte serial form (each byte containing 8 information bits and one parity bit), and LRC generator circuits 95 develop the cumulative longitudinal parity in each of the byte and parity bit positions (corresponding to recording track inputs in the real tape equipment). The LRC generator output is sampled after CRC reception and entered into buffer 93. Under the direction of controls 96 (discussed in detail later) the data, CRC and LRC bytes are each delayed in the buffer for the predetermined echo delay period (corresponding to the physical transport delay between write and read-while-write heads of the replaced tape equipment), and echoed to the TCU via selection circuits 97 and drivers 74. Controls 96 uniformly time echo transfers of data bytes, unambiguously distinguish the time at which the last data byte of the record is being echoed, switch to a different internal time base reference, and time transfers of CRC and LRC bytes with the latter reference.

In Read and Reverse type operations, data is passed from the auxiliary system to the TCU through FIFO buffer 93. In buffer 93 the data is delayed, as for Write echoing, and controls 96 act to properly time output transfers of data bytes and CRC and LRC characters to interface 70. In Read transfers the auxiliary system supplies the LRC information with a control flag (immediately behind the CRC character), and the adapter's LRC generator 95 is disabled. Due to this difference between Write and Read transfers, controls 96 require slightly different counting adjustments explained later for accomplishing recognition of the time at which the last data byte is being transferred out of the FIFO buffer.

Relevant details of controls 96 and its operation are shown in FIGS. 6 and 7. Referring to this figure, oscillator 101 and frequency divider 102 provide clocking references CLK-a and CLK-b for entry and removal of data and check characters relative to FIFO buffer 93 (refer also to the previous discussion of FIGS. 4 and 5, and recall that data bytes are sent to the TCU at a first uniform rate and CRC and LRC bytes are sent at a second slower rate). Oscillator 101 is externally synchronized with incoming byte signals, and operates free running when no signals are being sent to the adapter.

CLK-a and CLK-b, are time staggered, as shown in FIG. 7, in order to discretely separate the timing of information byte transfers into and out of the FIFO buffer. While bytes (data, CRC or LRC) are being clocked into the buffer, and while data bytes are being removed from the buffer (for transfer to the TCU), these two clocks have a first fixed recurrence frequency 103 (FIG. 7) associated with the recurrence frequency of data bytes originating at the TCU. However, when CRC and LRC bytes are being output from the buffer, these clocks are extracted from a different dividing portion of divider 102 and have the slower timing 104 (FIG. 7). Since entry of information into the buffer invariably terminates before the output transfer of CRC and LRC information (the echo delay is longer than the space occupied by the "incoming" CRC and LRC functions) the timing of CLK-a during CRC and LRC outputs is actually immaterial.

At the beginning of each record transfer operation frequency divider 102 is activated by a start level at its input 106 and conditioned for timing reception of data bytes (i.e. for producing timing pattern 103, FIG. 7). At the end of each record transfer operation, the divider is deactivated by a stop level at 105. While the adapter is transferring the last data byte of a record to the TCU (during each Read transfer or the echoing phase of a Write transfer) its output timing control logic 106 raises "shift to CRC timing" pulse at divider input 107 which causes the divider to select the timing pattern 104 (FIG. 7) suitable for timing transmittal of the concluding CRC and LRC characters of the record.

As data bytes begin to arrive at either adapter interface (the TCU interface in Write operation, or the Auxiliary system interface in Read operation), the "in strobe" pulse, which times reception of the first data byte, passes through delay circuit 108 and, after a delay corresponding to the echoing delay of real magnetic tape equipment, activates AND circuit 109 to set latch 110. When the latch is set, its output E0 becomes active, preparing AND circuit 112 in timing control logic 106. Preparation of AND 112 permits subsequent passage of a "shift to CRC timing" signal to divider input 106 when compare circuit 113 detects an equal comparison between counts manifested by counters 114 and 115. These counters are unequal after reception of the first data byte and remain unequal until the last data byte is forwarded (in a Read) or echoed (in a Write).

Under conditions described below, counter 114 counts incoming bytes received by the adapter, from either the TCU or auxiliary system, and counter 115 counts outgoing data bytes (but not CRC or LRC bytes) exiting from the buffer to the TCU. The counts in counters 114 and 115 are respectively incremented by 1 as bytes are respectively entered into and removed from buffer 93 under control of respective AND circuits 116 and 117. Counter 114 is also selectively decremented by 1 under control of AND circuit 118.

AND 116 adds an increment to the "in count" (counter 114) for each incoming data byte (received either at the TCU interface during a Write, or the auxiliary system interface during a Read) and for each CRC byte received from the TCU during a Write operation. The in count is not changed when a CRC or LRC byte is being received from the auxiliary system during Read operation; at such times the normally active "not auxiliary flag" input of AND 116 circuit is deactivated by the auxiliary system in a manner explained later. AND 118 decrements the in count when a "TCU Flag" signal is given by the TCU at completion of its transfer of a CRC byte during a Write operation. This decrement effectively nullifies an increment added during prior reception of the CRC byte and causes the in count to correspond thereafter to the exact number of data bytes contained in the received record. Since the in count is not incremented during CRC reception in the Read operation, and incremented but nullified during CRC transfer in Write operations, it will be understood that after CRC reception in any record transfer this count will correspond exactly to the number of received data bytes, and remain constant thereafter until the last data byte of the same record is forwarded (or echoed) to the TCU.

Record bytes received at either interface enter FIFO buffer 93 through selector 94, are held in the buffer for a delay interval corresponding to the echoing delay of real magnetic tape, and are then transferred to the TCU in the order of reception via AND gating portion 97a of selector 97 under control of E0 (which is timed via delay 108 to correspond to the echo delay). Byte inputs to buffer 93 are timed in coincidence with CLK-a outputs of divider 102, and outputs from the same buffer are "nonblockably" timed in coincidence with CLK-b. Since CLK-a and CLK-b are discretely separated in time (see 103, 104 in FIG. 7) the possibility of blocking (access conflicts while data is being received and sent out concurrently) is avoided.

Incoming data (during either a Read or Write operation), and the incoming CRC in each Write operation, are steered into buffer 93 through AND gates 120 (in bit parallel, byte serial form). During Write operations, the concluding CRC byte received from the TCU is accompanied by a flag signal which activates AND gates 121, at control inputs 122, causing an LRC byte locally generated at 96 (FIG. 3) to be passed into the FIFO buffer (while in count 114 is being decremented, as explained above, to nullify the increment added for the preceding CRC byte). During Read operations CRC and LRC bytes sent by the auxiliary system are both accompanied by AUX control flags which activate inputs 123 of AND gates 124 (and deactivate the incrementing controls of in counter 114) allowing "uncounted" entries of these bytes into the buffer.

LRC generator 95 (FIG. 3) contains nine not shown single stage counters which develop the cumulative parities of bits received in respective bit (track) positions of incoming bytes during Write operation. Accordingly, when gates 121 are activated by the TCU after reception of each Write CRC the value transferred to buffer 93 corresponds to the required LRC function.

The flag signals controlling gates 121 and 124 are presented by the TCU and auxiliary system via control lines separate from the data and parity bit bussing lines shown in FIG. 3 which are not specifically relevant to the invention presently sought to be claimed. Incidentally, it should be noted with reference to FIG. 3 that with the single exception of the path leading into receivers 81 all of the information byte bussing paths at interfaces 70 and 80 are nine bits wide (for accommodating 8 intelligence bits and 1 associated parity bit). The path into receivers 81 contains 11 bit lines for purposes not particularly relevant to this invention but mentioned here for completeness. These 11 bit lines accommodate 8 information bits, a "fixed" parity bit "p", a variable parity bit "a", and a selection bit "b". Selector 81a selects the "p" or "a" bit for transfer with the 8 information bits depending on the value of the "b" bit. This enables the auxiliary system to send the LRC information through the adapter because of the following constraints.

All "p" bits have a fixed relation of only odd parity (or only even parity) to the respective 8 information bits, whereas the "p" bit accompanying the LRC may have either odd or even parity relation depending on the number of prior "1's" in the "p" bit "reception track". The "p" bits sent by the auxiliary system has fixed (odd only or even only) parity relation to the accompanying information bits, whereas the "a" bit accompanying the LRC bits has any relative parity; i.e. the parity which would have been generated by either "native" tape equipment or LRC generator 95. The "a"

bit can also be used to permit the auxiliary system and adapter to send "bad" parity to the TCU for diagnostic purposes.

Those skilled in the art should now recognize that the circuits 106 operate to unambiguously distinguish the time at which the last byte of data is being sent to the TCU, during forwarding to the TCU of records received from the AUX system in Read operations and echoing of records received in Write operations. Although the in and out counts 114 and 115 are initially equal, prior to reception of the first data byte of a record, AND 112 is disabled at such times (since E0 becomes active only after reception of the first data byte and tallying of its increment to the in count), and therefore CLK-a and CLK-b have the "fast" timing 103 (FIG. 7) during data byte reception. Thereafter, the in and out counts become equal only after reception of the last data byte (since byte outputs to the TCU are delayed, relative to corresponding byte inputs to the adapter, and corresponding increments to the out count are delayed relative to corresponding increments to the in count). Since byte outputs to the TCU are timed in precise relation to the adapter inputs (due to the derived synchronization of oscillator 101 and the predetermining phasing of CLK-b), the final increment to the out count which brings it into equal relation to the in count occurs at a predetermined time during the forwarding (or echoing) of the last data byte (i.e. at a predetermined CLK-b phase). Therefore the shifting of divider 102 to the slow timing pattern 104 (FIG. 7) for CRC and LRC transfer occurs in precise and predetermined time relation to the last data byte transfer and provides the timing for CRC and LRC transfers which the TCU "expects".

Those skilled in the art should also recognize that the "last data byte output time" determination made by logic 106 could be accomplished equivalently by other logical configurations (for instance, pre-incrementing the out count, by 1 at the beginning of each Write operation and by 2 before each Read operation, would give the same result without dependence on TCU and AUX flags, but with possible complication of error diagnostics).

While we have illustrated and described a preferred embodiment of our invention, it is to be understood that we do not limit ourselves to the precise constructions herein disclosed and hereby reserve rights to all changes and modifications thereof within the scope of the following claims.

What is claimed as new is:

1. In a data processing system in which signals representing information records are normally transferred from a primary processing system to magnetic tape storage equipment and corresponding signals are echoed from the tape equipment after a predetermined echo delay, the signals of each such record consisting of a varied length sequence of data byte signals timed at a first rate followed by a fixed length sequence of check byte signals timed at a second rate different from said first rate, said signals being stored by said equipment on magnetic tape media subject to manual handling, a method for replacing said tape equipment with a general purpose auxiliary processing system performing all of the functions of said tape equipment and presenting an interface to said primary system, for signal reception and echoing, which is identical to the interface presented by said tape equipment, but providing processing functions not available in said tape equipment and eliminating said manual handling of tape media, said method comprising performing the following operations in said auxiliary system:

receiving said record signals from said primary system;

storing information corresponding to said received signals byte sequentially in a buffer store having a limited capacity associated with said echo delay;

retrieving said information byte sequentially from said buffer store, in the order of byte entry into said store, after time intervals corresponding to said echo delay;

transmitting echo signals to said primary system corresponding to said retrieved bytes;

determining when information being retrieved from said store respectively represents data bytes and check bytes; and responsive to said determination, selectively timing the echo signals corresponding to said data bytes at a rate corresponding to said first rate and the echo signals corresponding to said check bytes at a rate corresponding to said second rate.

2. The replacing method of claim 1 wherein said determining and selective timing steps are carried out by:

counting byte inputs to and outputs from said buffer store during reception of each said record;

detecting when said input and output counts are equal;

selecting said first timing rate when said counts are not equal; and selecting said second rate when said counts are equal.

3. The method of claim 2 wherein said input counting step comprises:

determining when the last data byte of a record has been input to said store by detecting reception of the first check byte of the respective record;

counting byte inputs to said store, including tallying a count for said last data byte and another count for said first check byte;

subtracting a count from said input count upon detecting reception of said first check byte; and inhibiting further input counting after said subtracting step.

4. The method of claim 3 including:

responsive to said step of determining when said counts are equal, inhibiting further output counting.

5. The method of claim 1 wherein said retrieving step is carried out by:

detecting the time of reception of a first data byte of a record;

detecting passage of a delay interval corresponding to said echo delay with reference to said time of reception; and initiating retrieval of bytes from said buffer store upon detecting said interval passage.

6. In a data processing system in which signals representing information records are normally transferred from a primary processing system to magnetic tape storage equipment, and corresponding signals are echoed from the tape equipment after a predetermined echo delay, the signals of each such record consisting of a varied length sequence of data byte signals timed at a first rate followed by a fixed length sequence of check byte signals timed at a second rate different from said first rate, the signals received by said tape equipment being stored on magnetic tape media subject to manual handling, the improvement comprising an auxiliary general purpose processing system substitutable plug compatibly in place of said tape equipment, with effective transparency to said primary system—i.e. presenting an interface to said primary system for signal reception, signal echoing, and information storage which is identical to the interface presented by said tape equipment—while providing processing functions not available in said tape equipment and eliminating said manual handling of tape media, said auxiliary system comprising:

transceiving means for receiving signals from and transmitting signals to said primary system;

a general purpose auxiliary processor;

means coupling said transceiving means to said auxiliary processor for transferring signals received from said primary system to said auxiliary processor for storage and further handling;

an electronic buffer store having a capacity related to said echo delay;

input and output means coupled between said buffer store and said transceiving means for respectively entering information bytes into said store corresponding to signals sent by said primary system and retrieving bytes from said store corresponding to signals to be echoed to said primary system; and means controlling said output means to send echo signals corresponding to said retrieved bytes to said primary system, via said transceiving means, with a form corresponding to the respective received signals i.e. with said echo signals delayed by said echo delay relative to respective signals sent by the primary system, and with data and check byte elements in said echo signals sent at different timing rates corresponding to said first and second rates.

7. An auxiliary processing system in accordance with claim 6 including:

timing means coupled to said input and output means for time staggering input and output operations relative to said store, whereby said operations may be performed concurrently without interferring.

8. An auxiliary system in accordance with claim 6 including:

delay timing means coupled to said transceiving means for measuring a delay interval corresponding to said echo delay with reference to the time of reception of a first data byte of a record being sent by said primary system;

means coupled to said transceiving means for generating first and second rate timing signals in synchronism with the reception of signals from said primary system; said first and second rate timing signals recurring at rates corresponding to said first and second rates of signals sent from said primary system;

means responsive to said delay timing means and said generating means for controlling said output means to begin retrieving bytes from said store after said echo delay interval and to conditionally continue retrieving bytes thereafter at a rate determined by said first rate timing signals;

means for determining when the last data byte of a record has been retrieved from said store and echoed to said primary system; and means responsive to said determining means for conditioning said controlling means to control said output means to retrieve and echo bytes corresponding to said check bytes at a rate determined by said second rate timing signals.

9. An auxiliary system in accordance with claim 6 including:

means for controlling said input and output means to access said store concurrently without interference said means comprising:

an oscillator having free running and synchronous modes of operation;

means coupling said transceiver to said oscillator for conditioning said oscillator to operate in said synchronous mode, while signals are being received from said primary system, and in said free running mode at other times; and means coupled to said oscillator for generating relatively time staggered input and output control signals for controlling operations of said input and output means relative to said store.

10. An auxiliary system in accordance with claim 6, wherein the check byte signals sent by said primary system contain only a single cyclic redundancy check (CRC) byte and said auxiliary system is required to echo two check bytes, one corresponding to said CRC byte and a second one corresponding to a longitudinal redundancy check (LRC) byte normally created in said tape equipment by write/read interaction between said equipment and its tape media, said interaction effectively placing on the tape medium a byte representing the longitudinal parities of the bits in all preceding bytes, said system including:

means coupled to said transceiving means for calculating cumulative longitudinal parities of bits in bytes successively received from said primary system during transfer of a said record;

means coupled to said transceiving means for detecting reception of a said CRC byte; and means responsive to said CRC detection to couple said parity calculating means to said input means for causing the parity functions accumulated by said calculating means to be stored in said buffer store as said LRC byte.

* * * * *